United States Patent [19]

Bussey, Jr. et al.

[11] 3,966,383

[45] June 29, 1976

[54] APPARATUS FOR EMBOSSING FILM

[75] Inventors: Francis H. Bussey, Jr., Rosedale; James K. Rutherfoord, Terre Haute, both of Ind.

[73] Assignee: Ethyl Corporation, Richmond, Va.

[22] Filed: Dec. 30, 1974

[21] Appl. No.: 537,195

[52] U.S. Cl. ............................ 425/388; 425/194; 264/92; 264/284
[51] Int. Cl.² ........................................ B29C 17/00
[58] Field of Search ........... 425/194, 126, 224, 378, 425/384, 388, 385, 466, 326 R; 264/92, 284; 74/241

[56] References Cited
UNITED STATES PATENTS

| | | | |
|---|---|---|---|
| 2,660,757 | 12/1953 | Smith et al. | 425/388 |
| 2,776,452 | 1/1957 | Chavannes | 425/194 |
| 3,105,589 | 10/1963 | Conley et al. | 74/241 |
| 3,832,120 | 8/1974 | Shaffer | 425/466 |
| 3,832,120 | 7/1974 | Shaffer | 425/466 |

*Primary Examiner*—Robert D. Baldwin
*Assistant Examiner*—Robert J. Charvat
*Attorney, Agent, or Firm*—Donald L. Johnson; John F. Sieberth; David L. Ray

[57] ABSTRACT

An apparatus for vacuum embossing sheet thermoplastic material which utilizes an endless, seamless structure as the embossing surface. A sheet of heat-softened thermoplastic film is passed over an embossing screen, the embossing screen being supported by a support roll, a drive roll and two seal rolls. A vacuum is applied to the screen between the seal rolls to pull the film into contact with the screen thereby producing an embossed pattern on the film corresponding to the outer surface of the screen. After the film is removed from the endless, seamless screen the film is cooled to set the pattern in the film. The process produces an embossed film which has high strength, low surface gloss or light reflectance, and a deep embossed pattern.

7 Claims, 7 Drawing Figures

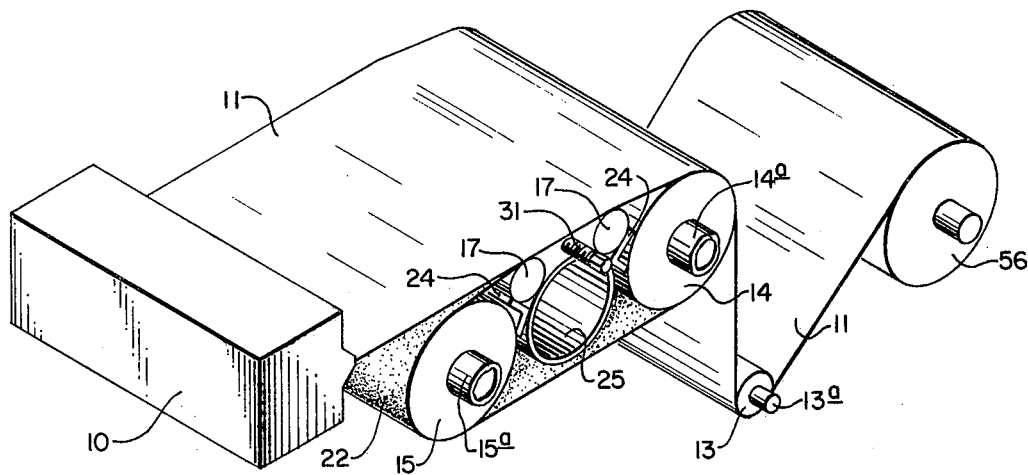
FIG. I.
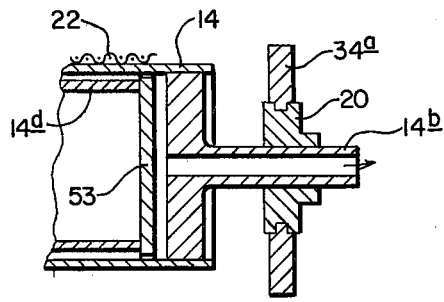
FIG. 7.

APPARATUS FOR EMBOSSING FILM

BACKGROUND OF THE INVENTION

The present invention relates to an apparatus for producing embossed thermoplastic sheet material utilizing a vacuum embossing method and apparatus with an endless, seamless screen as the embossing surface, the screen being supported by a support roll, a drive roll, and two seal rolls.

Embossed plastic film or sheet material has come into widespread use in many fields. One particularly large scale use of embossed thermoplastic sheet material is that of disposable articles such as hospital pads and drapes, wearing apparel and disposable diapers. Embossed film is also finding increased use in the packaging field, for example, as bags or overwraps for articles such as clothing and for shopping bags. In order to fulfill the requirements established by the end use of embossed film, is is desirable that the film have suitable properties for handling by fabricating machines, particularly those used for the manufacture of disposable articles, e.g., disposable diapers, sheets, pillow cases, drapes, raincoats, etc. In many cases it is important that the embossed thermoplastic film be soft and flexible and have the proper pattern and embossed depth in order to provide the desired "hand" or clothlike feel for the thermoplastic embossed material. Additionally, for many uses it is desired that the embossed thermoplastic material have as low a surface gloss as possible in order to simulate woven clothlike fabrics. Further, embossed thermoplastic materials must meet minimum physical specifications which are necessary in order that the films be handled in high speed, automatic fabricating machines, i.e., they should have suitable modulus, tensile strength, and impact strength.

Heretofore, embossed thermoplastic films such as polyethylene, polypropylene, polybutene-1, polyvinyl chloride and other flexible thermoplastic thin films have been made by various methods. One method is to extrude the thermoplastic film from a conventional slot die onto a continuously moving, smooth, cool, casting surface, e.g., a chill roll. The engraved pattern may be applied to the chill roll and the film pressed to the roll while in the amorphous or molten stage by press rolls. Alternatively, the chill roll may be smooth and the desired pattern in the film may be pressed into the film on the chill roll by means of an engraved and machined embossing roll which is pressed against the film and the chill roll to impress the pattern into the film as it is cooled on the chill roll.

Another technique used is to produce engraved rollers and to provide a heated, moving strip of film for engagement by the nip of the rollers, one of which carries the embossing pattern.

Embossed film has been prepared to a very limited extent by the use of vacuum embossing processes. Heretofore, it has been difficult to economically produce vacuum embossed film which has the characteristics and properties of film produced by the more conventional high pressure embossing processes. In one process for producing vacuum embossed film an endless belt made of a wire mesh which is butt welded to produce the endless belt is utilized. One embodiment is carried over a vacuum box, and heated film is applied thereto to impress the pattern of the screen on the heated film. In another embodiment the endless, butt welded screen is mounted on a cylindrical drum having a foraminous surface, and vacuum is applied to the hollow drum to pull the heated film into contact with the wire screen. However, the belts have a welded joint mark which marks the embossed film once during each revolution of the belt. Thus, the film is suitable only for use in limited applications wherein the pattern can be cut into sections and used to avoid the joint mark produced by brazing or welding the ends of the metal screen together.

Other processes used in vacuum embossing film utilize perforated vacuum embossing cylinders which carry an outer layer of a porous substance, such as metallic mesh, fiberglass, embossed paper or woven fabric materials as the outer embossing surface thereon. The perforated cylinders carry on their outer surface the sized sleeve which is either butt jointed and/or lap jointed and thus produces a transverse mark on the thermoplastic embossed film as it is carried over the joint in the sleeve covering. It has been suggested to reweave the fabric together; however, it has been found that this is an extremely tedious and expensive operation and cannot be commercially accomplished to produce a wide variety of rolls from fabric materials.

From the foregoing it can be seen that the previously utilized processes and apparatuses for vacuum embossing film suffer from numerous disadvantages which either increase the cost of vacuum embossed film and/or produce vacuum embossed film which does not have properties equivalent to that of film embossed by the pressure embossing method. Previously used processes and apparatuses for vacuum embossing film have suffered from the inability to produce long, continuous lengths of vacuum embossed film without having transverse marks across the film at periodic intervals equal to the length of the emobssing belt and/or the circumference of the screens which are used to cover the embossing cylinder.

Additionally, many of the processes and apparatuses used heretofore for vacuum embossing film do not produce clear, distinct, sharp patterns having the desired "hand" or feel which is comparable to pressure embossed film. Further, many of the films produced by vacuum embossing have been found to be very deficient in physical properties to equivalent embossed films, i.e., they have a low modulus, low tear strength, poor impact strength and nonuniform roll contours when rolled into large size rolls for shipment.

SUMMARY OF THE INVENTION

It is an object of the present invention to provide an apparatus for producing vacuum embossed thermoplastic film.

It is a further object of the present invention to provide apparatus for producing vacuum embossed thermoplastic film having enhanced physical properties.

It is a still further object of the present invention to provide an economical and efficient apparatus for producing vacuum embossed film.

The process of the present invention for vacuum embossing thermoplastic film may be carried out by continuously advancing a length of the film that is heated at least to its softening temperature and applying the heated film to a portion of the surface of an endless, seamless, perforated screen or belt supported on a plurality of rotatable rolls. The perforated screen or belt is advanced at the same rate as the heated film. A vacuum is applied to at least a part of the undersurface of the perforated screen or belt to pull the heated film into contact with the top surface of the screen or belt to cause the film to assume the shape of the pattern provided on the top surface of the screen or belt. Heat is removed from the embossed film at a rate sufficient to maintain the embossed film at a temperature sufficiently low enough to cause the embossed film to substantially retain the pattern when removed from the belt or screen. The film is continuously removed from the screen or belt.

The apparatus of the present invention for vacuum embossing sheet material includes a support roll, a drive roll, a support structure for mounting the support roll and the drive roll for rotation, an endless, seamless, flexible, porous screen mounted on the support roll and the drive roll for rotation therewith, and a vacuum assembly positioned between the pair of support rolls and engaging a portion of the underside of the screen that extends between the pair of support rolls.

BRIEF DESCRIPTION OF THE DRAWINGS

FIG. 1 is a perspective, schematic view of one embodiment of an apparatus of the present invention suitable for carrying out the process of the present invention;

FIG. 7 is a partial cross-sectional view taken along lines 7—7 of FIG. 2.

DESCRIPTION OF THE PREFERRED EMBODIMENTS

Figure 2:
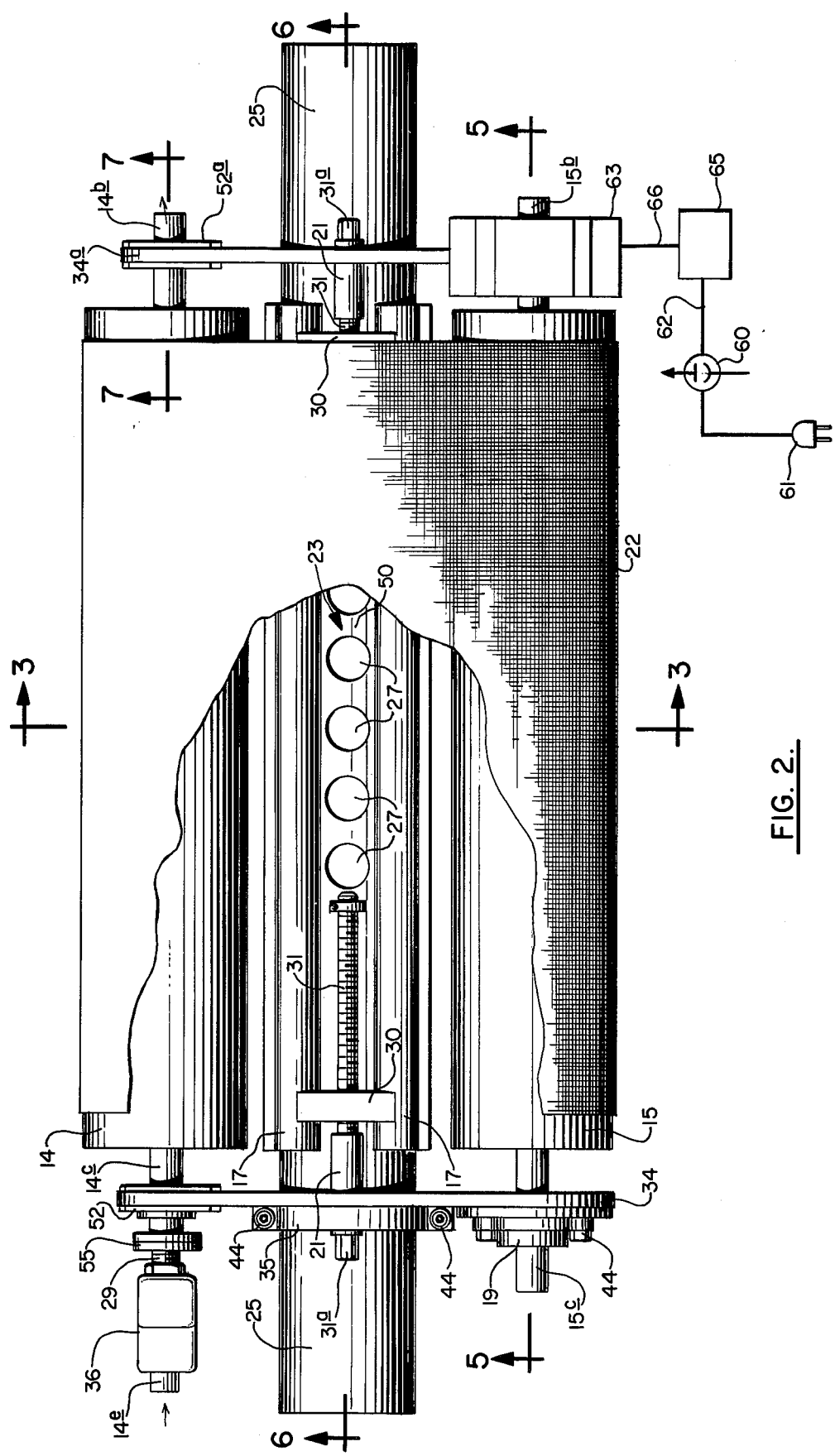
FIG. 2 is a top plan view of a portion of a preferred embodiment of the apparatus of the present invention with a portion of the endless, seamless screen being cut away.

Referring now to FIG. 1, there is shown a schematic view of an apparatus of the present invention suitable for carryiing out the process of the present invention which includes a conventional slot die 10. It will be understood that slot die 10 is fed a plasticized melt of a suitable polymer for forming a film (e.g., polyethylene, polypropylene, polyvinyl chloride) and extrudes a sheet of film 11 in a horizontal direction. The sheet of film 11, while still hot from extrusion, is applied to the top surface of an endless, seamless, flexible, porous screen 22. Screen 22 is mounted on drive roller 14 and on support roller 15, rollers 14 and 15 being identical in construction. Spaced-apart cylindrical seal rolls 17—17 make rolling contact with the underside of screen 22. A vacuum is applied by manifold 25 to the area lying between seal rolls 17—17 and deckles 30—30 to pull the film 11 down onto screen 22 to emboss the film. After the film leaves screen 22 it next passes over chill roller 13 which is temperature-controlled to cool the film, and from there it passes on to any suitable wind-up roller 56, or the like for storing the film. Rollers 13, 14 and 15 are hollow inside and have hollow shafts 13a, 14a and 15a, respectively, at each end thereof for circulating heating or cooling fluid therethrough. It is understood that any suitable means may be used for heating the film prior to the heated film being received in the apparatus described hereinbefore in FIG. 1, e.g., infrared lamps, hot air, passing the film over heated rollers, or in contact with other suitable heated surfaces.

Figure 3:
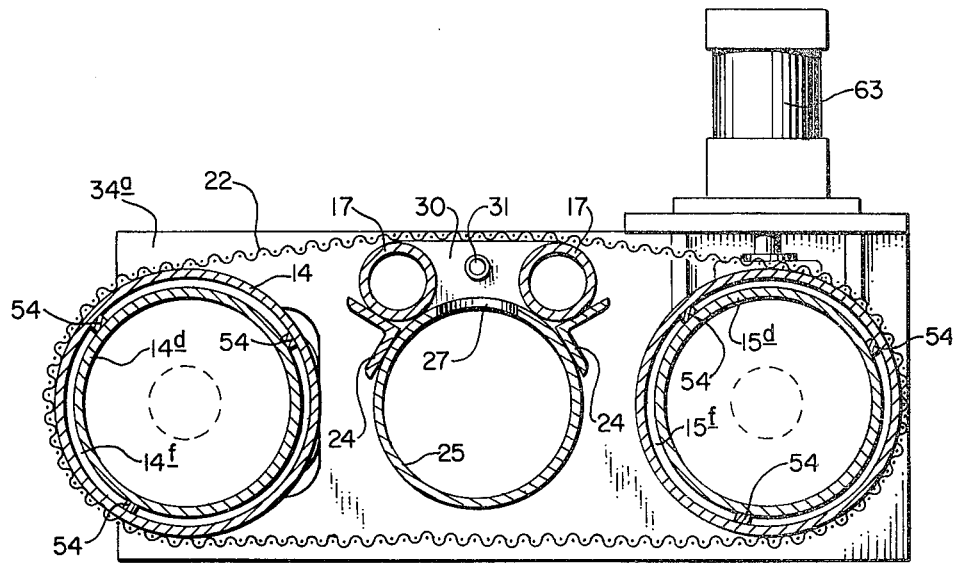
FIG. 3 is an elevational sectional view taken along lines 3—3 of FIG. 2.
Figure 4:
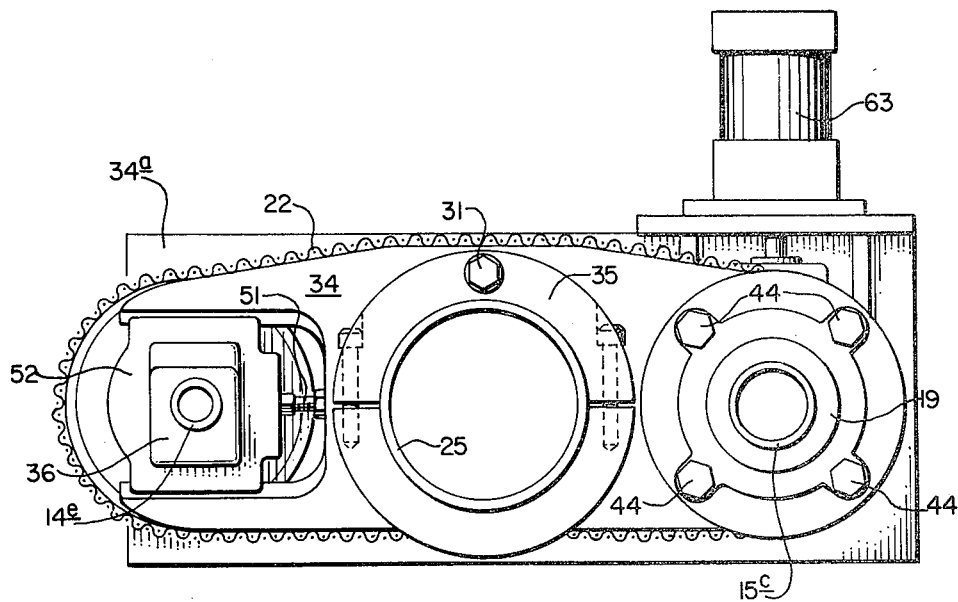
FIG. 4 is an end view of a portion of the apparatus of FIG. 3.

FIGS. 2–7 depict in greater detail a preferred embodiment of an apparatus of the present invention for vacuum embossing film. Referring now to FIGS. 2–6, the apparatus includes a generally hollow, cylindrical drive roller 14 which drives screen 22 about support rollers 15 and over seal rolls 17—17. Rollers 14 and 15 can be made from any suitable metal, e.g., steel, aluminum, bronze, etc. Drive roller 14 is preferably covered with a suitable elastomeric covering (not shown) such as, for example, a neoprene or silicone rubber. As seen in FIGS. 2 and 4, drive roller 14 is rotatably supported by hollow shaft members 14c and 14b received in bearings 52 and 52a, which are attached to end plates 34 and 34a. Shaft member 14c is connected by hollow nipple 29 to rotating union 36. Union 36 is connected by a supply conduit (not shown) to a suitable supply of a heating or cooling fluid, e.g., water or oil, and the shaft member 14b is connected to a discharge conduit and union (not shown) for returning the fluid to the supply source. Thus a heating or cooling fluid may flow through the hollow interior 14f (see FIGS. 3 and 5) of drive roller 14, as indicated by the arrows in FIG. 2.

Also located on shaft 14c is pulley 55. Pulley 55 is driven by any suitable drive means such as a flexible V-belt, for example. Pulley 55 could also be replaced by a sprocket or any other conventional drive means.

Figure 5:
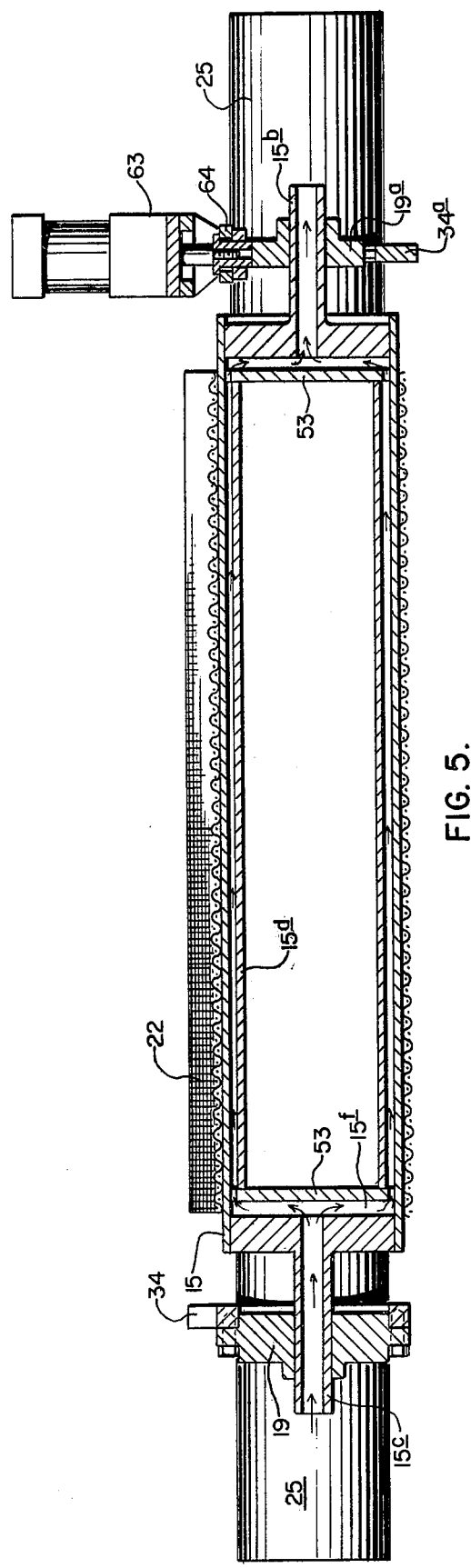
FIG. 5 is a cross-sectional view taken along lines 5—5 of FIG. 2.

As can be seen in FIGS. 3 and 5, inner cylinders 14d and 15d are contained with rollers 14 and 15, respectively. The inner cylinders 14d and 15d are sealed at each end by end plates 53—53 and are connected to rollers 14 and 15 by supports 54, as shown in FIG. 3. The inner cylinders 14d and 15d form a fluid space 14f and 15f through which heating or cooling fluids flow as indicated by the arrows in FIG. 5. More rapid and efficient heat transfer is effected by this preferred design. However, inner cylinders 14d and 15d and end plates 53—53 could be eliminated if desired.

Support roller 15 is identical in construction, as previously mentioned, to drive roller 14 and is supported by hollow shaft members 15b–15c, respectively, which are received in bearings 19a and 19 attached to end plates 34a and 34. Also, support roller 15 is hollow inside and is constructed in such a manner that heating or coolant fluids such as oil or water may be forced therethrough in the manner previously explained. As can be seen in FIGS. 2, 3 and 5, support roller 15 may be heated or cooled by supplying a fluid through hollow shaft members 15c at one end and discharging the fluid through hollow shaft members 15b at the other end.

Drive roller 14 is biased away from support roller 15 by tensioning set screw 51, as can be seen in FIG. 4. An identical screw is located at the opposite end of roller 14. The screws 51—51 urge bearing assembly 52 and 52a outwardly to cause drive roller 14 to place tension upon screen 22, thereby forcing screen 22 snugly against the support roller 15, and seal rolls 17—17.

A vacuum assembly, designated generally by the numeral 23 is positioned between support roller 15 and drive roller 14 to supply vacuum to a portion of the underside of the top of screen 22. The assembly includes a generally cylindrical manifold pipe 25, which extends between end plates 34 and 34a and is attached thereto by welding or other suitable means. Seal retainer strips 24 are attached by bolts or other suitable means to each side edge of manifold pipe 25 and project outwardly therefrom. A pair of spaced apart seal rolls 17—17 are slidingly supported by manifold pipe 25 and strips 24—24. Rolls 17—17 make a sliding seal with retainer strips 24—24 and manifold pipe 25. Seal rolls 17—17 are preferably made from Teflon or other suitable plastic materials having a low coefficient of friction.

Located between seal rolls 17—17 are deckles 30—30 which in turn are threadably connected to deckle screws 31—31. Deckle screws 31—31 are connected by collars 21—21 to end plates 34 and 34a. By turning deckle screws ends 31a—31a held in mounting bracket 35 and end plate 34a, deckles 30—30 can be made to move inwardly and outwardly along the shaft of the screw to adjust for various widths or screen 22 or film 11. Each deckle 30, as can be seen in FIG. 3, has a straight top edge and a curved bottom edge which make sliding contact with the underside of screen 22 and manifold pipe 25, respectively. The side edges of each deckle are generally semi-circular in shape and fit flush against seal rolls 17—17 to provide a sliding vacuum seal therebetween.

Figure 6:
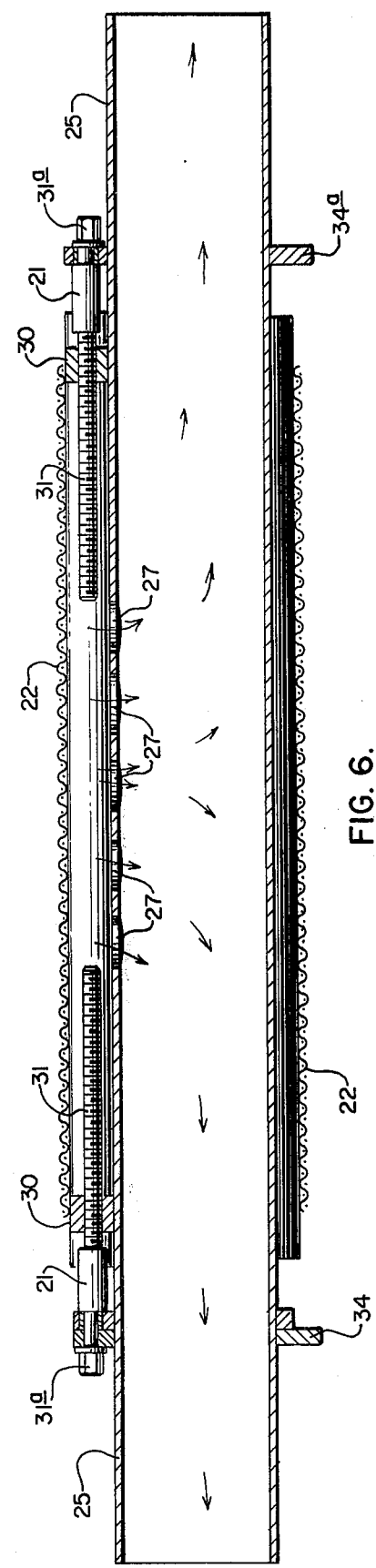
FIG. 6 is a cross-sectional view taken along lines 6—6 of FIG. 2.

As can be seen in FIGS. 2 and 6, manifold pipe 25 has openings 27 therein through which air flows in the direction indicated by the arrows when a vacuum is applied to manifold pipe 25. Vacuum is thus applied to the underside of screen 22 which overlies the vacuum chamber 50 defined by seal rolls 17—17. deckles 30—30 and manifold pipe 25. When heated film 11 is carried by screen 22 over seal rolls 17—17, the vacuum or low pressure existing in chamber 50 pulls the heated film 11 tightly against screen 22 to emboss the film.

In one preferred embodiment of the present invention, a hydraulic cylinder 63 is mounted on end plate 34a, as shown in FIGS. 2-5. The purpose of hydraulic cylinder 63 is to prevent screen 22 from sliding or walking off the end of drive roll 14 or support roll 15. Hydraulic cylinder 63 accomplishes this purpose by moving the end 15b of drive roll 15 upward or downward, thereby "steering" or causing screen 22 to move toward one end or the other of rolls 14 and 15.

As can be seen in FIG. 2, the hydraulic cylinder 63 is controlled by an electric eye (photoelectric cell) 60 which is adapted to read or "see" the edge 22a of screen 22. When electric eye 60 does not "see" the edge 22a of screen 22, a signal is sent through line 62 to cylinder control 65, which in turn varies the hydraulic pressure in hydraulic line 66 connected to hydraulic cylinder 63 to actuate hydraulic cylinder 63. Hydraulic cylinder 63 causes steering unit 64 to move bearing 19a upward or downward. Preferably there are two hydraulic cylinders 63—63, although only one is shown in the drawings. The other hydraulic cylinder would be located on end plate 34 at the opposite end 15c of roll 15 in the same manner in which hydraulic cylinder 63 is connected to end plate 34a. The other cylinder would move the end 15c of roller 15 in a direction equal to and opposite to the direction in which cylinder 63 moves end 15b, thus causing roll 15 to pivot about its center.

To carry out the process of the present invention a sheet of heated thermoplastic film 11 is applied to the top surface of screen 22 lying between drive roller 14 and support roller 15. Screen 22 is rotated by drive roller 14 thereby pulling film 11 over vacuum chamber 50. Vacuum is applied to each end of the vacuum manifold pipe 25, and a vacuum is created within the chamber 50 pulling the heated film into firm embossing contact with the upper surface of the embossing screen 22 to thereby transfer the pattern of the embossing screen to the heated film 11. The heated film 11, after passing over the vacuum space 50 is carried by screen 22 over drive roll 14 and around chill roll 13 where the embossed film is rapidly cooled to set the pattern of the film. Then, the cooled film is removed and wound on a storage roll 56, or other suitable storage means. The heated film 11 may be supplied by any of the means described hereinbefore, i.e., by extrusion from a slot die mounted directly above the embossing apparatus or by passing the film through a heated air oven, or by heating the film by noncontacting or contacting means, i.e., infrared heaters or heated rollers. The film, after passing over vacuum chamber 50 may also be cooled by circulating a cooling medium, e.g., refrigerated water, through hollow drive roll 14. Optionally, the embossed film may also be cooled by applying cold air to the top surface of the film after it passes over the vacuum chamber. Screen 22 may be preheated to enhance embossing of heated film 11 by circulating a heating medium through hollow support roll 15.

Suitable thermoplastic materials may be embossed by the process of the present invention, i.e., thin webs of from 0.25 mils up to as thick as 10 mils. Exemplary thermoplastic materials suitable for vacuum forming according to the present invention are polyethylene and polyethylene copolymers, e.g., polyethylene-polypropylene copolymers; polyvinyl chloride polymers and copolymers, e.g., polyvinyl chloride-polyvinyl acetate copolymers; polypropylene homopolymers and copolymers; Saran films; Mylar films; polystyrene films, and others.

While the use of refrigerated air and water contact have been described as one form of cooling the embossing roll or screen, it is understood that other forms may be used, i.e., internal fluid cooling may be utilized by providing suitable conduits and passages on the inside of the embossing roll. Also, conduits and passages can be provided in both the drive roll 14, support rolls 15, and chill roll 13 to remove heat from the embossing screen 22.

The foregoing embodiments are exemplary of the process and apparatus for carrying out the present invention; however, many variations of the invention may be made without departing from the spirit and scope of the invention.

What is claimed is:

1. In an apparatus for vacuum embossing sheet material, the combination comprising:
  a. a pair of spaced apart, generally parallel end plates;
  b. a pair of spaced apart, parallel, hollow rollers rotatably connected to said end plates, one of said rollers having heating means connected thereto, the other of said rollers cooling means connected thereto;
  c. an endless, seamless, flexible, porous screen fitted over said rollers connecting said rollers together to cause one roller to rotate when the other roller rotates;
  d. drive means connected to one of said rollers to rotate said roller and advance said screen;
  e. a vacuum assembly connected to said end plates and engaging a portion of the underside of said screen that extends between said rollers, said assembly positioned between said pair of rollers and partially inside said screen so that the portion of said screen passing over said roller having heating means connected thereto contacts said vacuum assembly before contacting said roller having cooling means connected thereto, said assembly including:
  i. a vacuum manifold means connected to said end plates;
  ii. seal roll retainer means connected to said manifold means;
  iii. a pair of spaced apart cylindrical seal rolls rotatably supported by said seal roll retainer means and said manifold means, each of said seal rolls rotatably contacting the underside of said screen;
  iv. two movably mounted end seal members connected to said end plates by adjusting means adjacent each end of said seal rolls, said end seal members making sliding, sealing contact with said manifold means, both of said seal rolls and the underside of said screen to provide a vacuum chamber underlying that portion of said screen lying between the lines of contact made on the underside of said screen by said seal rolls.

2. In the apparatus of claim 1 wherein said heating means includes means for supplying a flow of fluid through the hollow portion of said roller, said fluid having a temperature above the temperature of said sheet material prior to embossing.

3. In the apparatus of claim 2 wherein said cooling means includes means for supplying a flow of fluid through the hollow portion of said drive roller, said fluid having a temperature below the temperature of said sheet material after the embossing.

4. In the apparatus of claim 2 including means for positioning said screen on said pair of roller means while said apparatus is embossing said sheet material to maintain said screen between the respective ends of said pair of rollers.

5. In the apparatus of claim 4 wherein said means for positioning said screen includes electric eye means for determining the position of said screen and hydraulic cylinder means connected to said electric eye means for moving one of said roller means.

6. In the apparatus of claim 2 wherein said pair of cylindrical seal rolls are constructed from a fluorine-containing polymeric material.

7. In the apparatus of claim 6 wherein said fluorine-containing polymeric material is Teflon.

* * * * *